United States Patent [19]

Remba-Grondovski

[11] 4,166,092

[45] Aug. 28, 1979

[54] PROCESS FOR MAKING ARTISTIC PRINTS

[76] Inventor: Luis Remba-Grondovski, Dr. Barragan No. 763, Mexico City, Mexico

[21] Appl. No.: 835,374

[22] Filed: Sep. 21, 1977

Related U.S. Application Data

[63] Continuation of Ser. No. 633,768, Nov. 20, 1975, abandoned.

[30] Foreign Application Priority Data

Jan. 2, 1975 [MX] Mexico .................................. 155728

[51] Int. Cl.[2] .................................................. B29C 1/02

[52] U.S. Cl. ...................................................... 264/221

[58] Field of Search ................ 264/220, 226, 227, 221

[56] References Cited

U.S. PATENT DOCUMENTS 3,723,585 3/1973 Nussbaum ............................ 264/226

3,748,202 7/1973 Iisaka et al. .......................... 264/225

*Primary Examiner*—Robert F. White
*Assistant Examiner*—James R. Hall
*Attorney, Agent, or Firm*—Ladas, Parry, Von Gehr, Goldsmith & Deschamps

[57] ABSTRACT

The invention provides a process for making artistic prints on paper, cloth or other sheet material having a three-dimensioned surface texture. A smooth surface plate is first prepared of a waxy composition that is ductile and malleable at ambient temperature, and is also electrically conductive. An artist treats the surface of this plate by engraving and molding to produce a three-dimensional artistic work. An electrically conductive coating is applied to the treated surface and the plate is then coated in an electrolytic bath with a thin film of copper, which constitutes a mold of the artistic work. This copper film is separated from the waxy plate, -tinned, and strengthened by casting onto it a layer of lead. The copper surface of the composite plate is inked or colored with paint, and is then placed on the platen of a printing press having pressure rollers. The sheet material to be printed is placed over the copper surface under a blanket and passed through the press.

Editions of many substantially identical artistic prints can thus be produced.

3 Claims, No Drawings

PROCESS FOR MAKING ARTISTIC PRINTS

This is a continuation of application Ser. No. 633,768 filed Nov. 20, 1975, and now abandoned.

BACKGROUND OF THE INVENTION

Artistic prints made by the well-known procedures of etching, engraving, lithography are essentially flat and two-dimensional. The artist produces an original work on a flat hard metal or stone surface, and a printer makes a series of substantially identical direct impressions from such surface, bearing the imprint of the artist. However, heretofore artistic prints having a three-dimensional surface texture have not been possible. Reproductions of paintings and sculpture by other means do not involve the artist and lack originality.

The present invention provides a new technique whereby the artist works on a moldable-waxy surface to create a three-dimensional picture or composition, which is then converted into a corresponding metallic mold. Editions of three-dimensional substantially identical prints can be obtained by contacting the mold with the sheet material to be printed in a printing press, whereby the original artistic touch is retained.

SUMMARY OF THE INVENTION

One of the objects of the present invention is to provide a process for making three-dimensional prints of an original artistic work created directly on a wax plate. Such prints are colored and are embossed with the details that the artist has impressed on the wax plate.

A further object is that of providing a wax composition utilized by the artist to work directly on a plate thereof. The waxy formulation is important, and it constitutes one of the additional features of the invention inasmuch as it must possess certain properties without which effective results may not be achieved in the quality of the prints.

A still further object of the invention is that of combining this new technique for obtaining artistic prints, with known methods of printing, such as lithography, engraving, serigraphy, etc.

In order to carry out the process by which the artistic prints are produced in accordance with the invention, it is necessary to perform a series of successive steps in which various materials and procedures are utilized as follows:

(A) A wax composition is prepared by mixing different types of waxes and which additionally contains electrically conductive material such as graphite powder because the latter ingredient is necessary in order for the wax composition to be slightly conductive of electricity. This composition in molten form is poured into a mold in order to form a plate approximately 2 cms. in thickness with a smooth surface. An additional amount of wax composition may be applied so that a plate of uniform dimensions and smooth surface is produced.

(B) The artist treats the surface of the wax plate at ambient temperature by engraving and shaping. In order to create embossed effects, additional wax composition may be melted in a water bath and applied by means of a painter's brush. If the wax does not melt completely it may be molded like putty or sculptor's clay. It can of course be worked by any suitable instruments for molding and engraving, and also additional objects may be applied in order to produce particular artistic effects; thus for instance the pattern of a cloth fabric may be engraved for which purpose the fabric is impregnated with an additional amount of molten wax composition, and is then firmly applied to the wax plate. Obviously the use of warm instruments facilitates the engraving.

(C) In order to ensure electrical conductivity of the wax plate, a fine uniform coating of an electrically conductive material is applied to the surface that has been engraved or molded by the artist. Said material can be a powdered metal such as silver or graphite powder. Any excess can be eliminated by means of a brush or an air compressor.

(D) The treated and coated wax plate is immersed in an electrolytic bath for depositing a copper film over the treated conducting surface; the film thickness may be variable, but still sufficient to constitute a mold of the work performed by the artist. This electrolytic bath is conventional and composed of an aqueous solution of sulphuric acid and copper sulphate, and is applied at 2 volts as a maximum during a period of time that may fluctuate between 12 and 24 hours; if a higher voltage is applied the copper film may become brittle and then cannot be removed from the wax plate. Hence, it is necessary for the copper film to be flexible, which means that the voltage must be controlled between the specified limits.

(E) The copper film formed during the application of the electrolytic coating is removed by utilizing steam.

(F) Tinning is performed on the surface of the copper that has not been in contact with the wax plate, utilizing for this purpose tin powder and a blowpipe, in order to prepare the copper film for the following process step in which lead is adhered to the copper film.

(G) The tinned copper film is placed in a mold and thereafter, molten lead is poured over the tinned surface of the copper film whereby a casting having the purpose of strengthening the copper film is formed.

The casting is performed with molten lead until a lead coating having a uniform thickness of approximately 1 cm., is formed.

When the lead is poured, care must be taken to constantly heat the mold holding the tinned copper film, in order to ensure that the lead adheres completely to the tin and thereby to the underlying copper.

(H) The composite multi-layer plate formed by the lead-tin-copper coatings is cooled in such a manner that the lead solidifies. The whole composite plate is removed from the mold and is scraped on the lead side, so that the coating of this metal has a smooth surface as well as uniform thickness.

(I) The copper surface of the composite plate prepared in accordance with the previous step is colored by the artist or printer with ink or paint in order to obtain a three-dimensional colored print. The plate is then placed on the platen of a copper plate press leaving the copper film exposed and facing upward. The sheet material on which the three-dimensional print is to be produced such as paper, cloth, or thermoplastic material is than placed over the composite plate, and over this sheet material a soft cover blanket is placed, such as thick felt or rubber sheets. The copper plate press is started so that it pulls the composite plate and platen together with the cover blanket and passes them under heavy pressure between its two rollers, so that the blanket and the sheet material being printed sink into the surface of the engraved copper film. In this manner, the engraving is printed on the surface of the sheet material.

The sheet material to be printed may also be inked or colored before passage through the press.

EMBODIMENTS OF THE INVENTION

In order to put into practice the process just described any suitable composition of common wax may be utilized. However, by means of an extensive experimentation a specific waxy formulation has been developed by which extraordinary results may be achieved by the engraving process of the invention, and it may be stated that said process cannot work most efficiently or produce extraordinary results if the formulation that has been developed is not utilized. Said formulation has the following ingredients (by weight):

yellow wax (Virgin)—30 to 50%, e.g. 43.03%
candle wax—15 to 30%, e.g. 23.65%
paraffin—5 to 15%, e.g. 10.75%
turpentine—2 to 12%, e.g. 6.45%
impalpable graphite powder—12 to 24%, e.g. 16.12%

The wax composition must have the following characteristics:

(1) It must be malleable and ductile.

(2) It must not suffer sensible size changes at room temperature, nor must it be brittle.

(3) Upon melting it must be workable over the plate but it must retain relief effects.

(4) When molten, it must be sufficiently liquid so as to be able to impregnate objects with a very fine almost imperceptible film.

(5) When molten it must not form bubbles.

(6) It must be easily workable with modeling instruments at room temperature. It must become of a ductile consistency with the warmth of the hands.

(7) The graphite powder must be an electrical conductive element.

As embodiments of the invention there can also be mentioned the possibility of combining it with traditional techniques such as lithography, engraving, serigraphy, etc.

Up until now the invention has been described in accordance to its preferred embodiments; it must be understood that any modifications of the invention based on what has herein been described and claimed, necessarily fall within the scope of the invention.

I claim:

1. A process for making colored artistic prints having a three dimensional surface texture, comprising:

(a) melting a wax mixture having the following composition:
yellow wax (virgin) 30–50%
candle wax 15–30%
paraffin 5–15%
turpentine 2–12%
impalpable graphite powder 12–24%

(b) pouring said melt into a mold and cooling said melt to ambient temperature to form a solid wax plate having uniform thickness and a smooth upper surface, (c) working the smooth upper surface of said wax plate to form an artistic three dimensional relief design thereon, (d) depositing upon said worked surface of said wax plate electrically conducting powder to form a uniform coating thereon, (e) placing said powder coated wax plate within an acid copper solution and with a conducting maximum voltage of two volts for 12–24 hours, electroplating a thin copper plate upon said powder coated worked surface of said wax plate, (f) removing said copper plated wax plate from said copper solution and steaming said wax plate to remove said wax from said copper plate, (g) depositing tin powder upon the surface of said copper plate previously not adjacent the wax plate, and heating said wax plate to melt said tin powder to form a coating of tin over said one surface of said copper plate; cooling said plate and tin to solidfy and adhere said tin coating thereto, (h) placing said tin coated copper plate in a heated mold and pouring molten lead therein to contact and adhere to said tin coated surface only; cooling and solidifying said lead mass as a base for said copper plate, (i) scraping the surface of said mass of lead to provide a smooth surface and uniform thickness thereto, (j) coloring predetermined portions of the copper surface of said composite plate with ink or paint, (k) placing said colored composite plate, copper face up, on the platen of a printing press having pressure rollers, (l) placing over said colored copper plate surface a sheet of material to be printed; placing a cover blanket over said sheet material, and (m) pressing said sheet material against said colored copper plate with said pressure rollers to form said sheet material into a colored artistic print, having a three dimensional surface texture.

2. The process of claim 1 wherein in the working in step (c) objects including cloth fabric impregnated with wax are incorporated into predetermined portions of the surface of said wax plate.

3. The process of claim 1 wherein said sheet material is selected from the group consisting of paper, cloth and thermoplastic material.

* * * * *